United States Patent
Tanaka et al.

(10) Patent No.: US 9,326,180 B2
(45) Date of Patent: Apr. 26, 2016

(54) MOBILE COMMUNICATION METHOD, MOBILITY MANAGEMENT NODE, PACKET SWITCH, AND MOBILE STATION

(71) Applicant: NTT DOCOMO, INC., Tokyo (JP)

(72) Inventors: Itsuma Tanaka, Tokyo (JP); Takatoshi Okagawa, Tokyo (JP); Masahiro Sawada, Tokyo (JP); Tomoki Shibahara, Tokyo (JP); Keisuke Suzuki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 74 days.

(21) Appl. No.: 14/349,220

(22) PCT Filed: Oct. 1, 2012

(86) PCT No.: PCT/JP2012/075400
§ 371 (c)(1),
(2) Date: Apr. 2, 2014

(87) PCT Pub. No.: WO2013/051512
PCT Pub. Date: Apr. 11, 2013

(65) Prior Publication Data
US 2014/0254363 A1    Sep. 11, 2014

(30) Foreign Application Priority Data
Oct. 3, 2011    (JP) .................. 2011-219212

(51) Int. Cl.
*H04W 28/02*    (2009.01)
*H04W 48/04*    (2009.01)
(Continued)

(52) U.S. Cl.
CPC .......... *H04W 28/0226* (2013.01); *H04W 48/02* (2013.01); *H04W 48/04* (2013.01);
(Continued)

(58) Field of Classification Search
CPC ..... H04W 60/04; H04W 60/06; H04W 88/16; H04W 76/023; H04W 76/025; H04W 76/027; H04W 76/248
See application file for complete search history.

(56) References Cited

U.S. PATENT DOCUMENTS

| 8,566,455 B1 * | 10/2013 | Zhao | H04W 76/025 |
| | | | 709/227 |
| 2013/0242754 A1* | 9/2013 | Shaikh | H04W 24/04 |
| | | | 370/242 |
| 2013/0301547 A1* | 11/2013 | Gupta | H04W 76/048 |
| | | | 370/329 |

FOREIGN PATENT DOCUMENTS

| JP | H07-273762 A | 10/1995 |
| JP | 10-150686 A | 6/1998 |

(Continued)

OTHER PUBLICATIONS

International Search Report issued in PCT/JP2012/075400 mailed on Nov. 6, 2012 (4 pages).

(Continued)

*Primary Examiner* — Alvin Zhu
(74) *Attorney, Agent, or Firm* — Osha Liang LLP

(57) ABSTRACT

Even if a failure has occurred in core network equipment in a state in which bearers are established between a large number of UEs and a packet data network, congestion in the network is avoided. A mobile communication method according to the present invention includes steps of transmitting, by an MME, to transmit a "PDN Disconnection Request/Detach Request" including barring time to a UE when the MME disconnects a bearer between the UE and the packet data network due to a predetermined reason such as a failure in a S-GW/P-GW or the MME in a state in which the bearer is established, and barring, by the UE, a mobile originating call directed to the packet data network for the barring time.

5 Claims, 9 Drawing Sheets

(51) Int. Cl.
  *H04W 76/02* (2009.01)
  *H04W 48/02* (2009.01)
  *H04W 76/06* (2009.01)
  *H04W 24/04* (2009.01)
  *H04W 48/06* (2009.01)

(52) U.S. Cl.
  CPC .......... *H04W 76/027* (2013.01); *H04W 76/062* (2013.01); *H04W 24/04* (2013.01); *H04W 48/06* (2013.01); *H04W 76/064* (2013.01)

(56) References Cited

FOREIGN PATENT DOCUMENTS

| | | |
|---|---|---|
| JP | 2000-201379 A | 7/2000 |
| JP | 2002-016976 A | 1/2002 |
| JP | 2004-088429 A | 3/2004 |
| JP | 2005-204237 A | 7/2005 |

OTHER PUBLICATIONS

3GPP TS 23.060 V10.5.0; "3rd Generation Partnership Project; Technical Specification Group Services and System Aspects; General Packet Radio Service (GPRS); Service description; Stage 2 (Release 10)"; Sep. 2011 (321 pages).

3GPP TS 23.401 V10.5.0; "3rd Generation Partnership Project; Technical Specification Group Services and System Aspects; General Packet Radio Service (GPRS); enhancements for Evolved Universal Terrestrial Radio Access Network (E-UTRAN) access (Release 10)"; Sep. 2011 (282 pages).

3GPP TS 24.301 V10.4.0; "3rd Generation Partnership Project; Technical Specification Group Core Network and Terminals; Non-Access-Stratum (NAS) protocol for Evolved Packet System (EPS); Stage 3 (Release 10)"; Sep. 2011 (321 pages).

3GPP TS 24.008 V11.0.0; "3rd Generation Partnership Project; Technical Specification Group Core Network and Terminals; Mobile radio interface Layer 3 specification; Stage 3 (Release 11)"; Sep. 2011 (645 pages).

Japanese Office Action for corresponding Japanese Application No. 2011-219212 mailed Nov. 6, 2012 (6 pages).

Japanese Office Action for corresponding Japanese Application No. 2011-219212 mailed Jun. 25, 2013 (6 pages).

Search Report issued in corresponding European Application No. 12838858.4, mailed Nov. 12, 2015 (12 pages).

3GPP TS 24.301 V11.0.0; "3rd Generation Partnership Project; Technical Specification Group Core Network and Terminals; Non-Access-Stratum (NAS) protocol for Evolved Packet System (EPS); Stage 3 (Release 11)"; Sep. 2011 (323 pages).

NTT DOCOMO; "Discussion on the target procedures for the NAS Back-off Timer"; 3GPP TSG SA WG2 Meeting #80, TD S2-103784; Brunstad, Norway; Aug. 30-Sep. 3, 2010 (3 pages).

Renesas Mobile Europe Ltd; "Cell update-less RLC/PDCP unrecoverable error recovery"; 3GPP TSG-RAN WG2 Meeting #75bis, R2-115265; Zhuhai, China; Oct. 10-14, 2011 (4 pages).

HTC; "Add network-initiated EPS bearer deactivation with back-off timer for APN based congestion control"; 3GPP TSG SA WG2 Meeting #81, S2-104558; Prague, Czech Republic; Oct. 11-15, 2010 (3 pages).

HTC; "Add network-initiated PDP context deactivation with back-off timer for APN based congestion control"; 3GPP TSG SA WG2 Meeting #81, S2-104559; Prague, Czech Republic; Oct. 11-15, 2010 (4 pages).

* cited by examiner

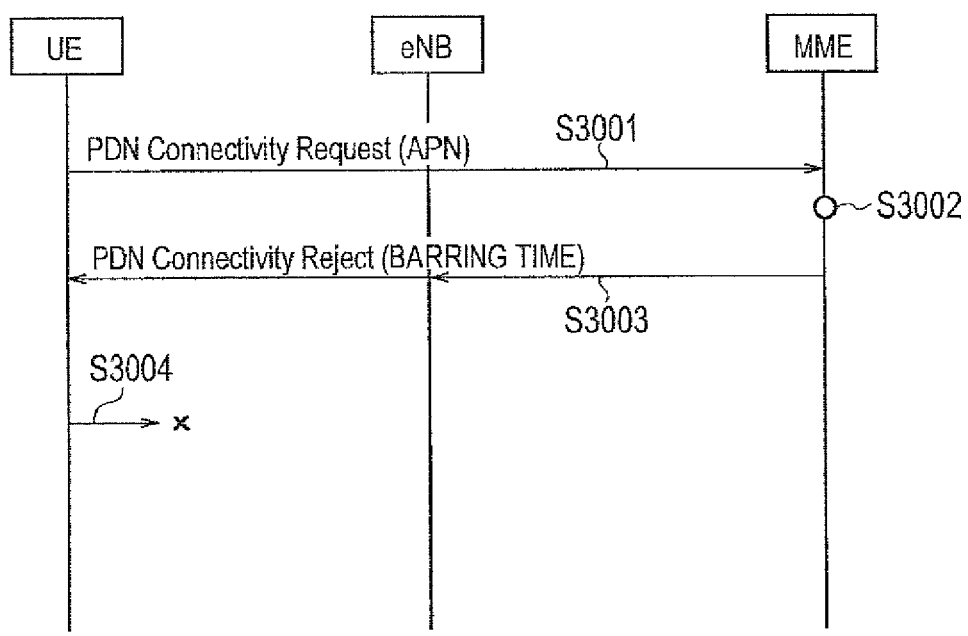

MOBILE COMMUNICATION METHOD, MOBILITY MANAGEMENT NODE, PACKET SWITCH, AND MOBILE STATION

TECHNICAL FIELD

The present invention relates to a mobile communication method, a mobility management node, a packet switch, and a mobile station.

BACKGROUND ART

In Rel-10 system of LTE (Long Term Evolution) and GPRS (General Packet Radio Service), a procedure for barring call origination from a UE (User Equipment, mobile station) that is enormous in traffic volume and a UE that repeats call origination many times in a short time is specified. Hereafter, such a procedure will be described briefly by taking the LTE system as an example with reference to FIG. 11.

Specifically, as shown in FIG. 11, a UE transmits "PDN Connectivity Request" directed to a certain APN (Access Point Name, identification information of a packet data network of connection destination) to an MME (Mobility Management Entity, mobility management node) at step S3001.

If the MME determines to bar call origination from such a UE at step S3002, the MME transmits "PDN Connectivity Reject" including barring time to the UE at step S3003.

At step S3004, the UE bars call origination directed to the APN for the barring time included in the received "PDN Connectivity Reject."

CITATION LIST

Non-Patent Literature

Non-Patent Literature 1: 3GPP TS23.401
Non-Patent Literature 2: 3GPP TS23.060

SUMMARY OF INVENTION

However, there is the following problem. In a state in which bearers are established between a large number of UEs and a packet data network, a large number of bearers are disconnected simultaneously due to a predetermined reason such as a failure in core network equipment such as a P-GW (PDN Gateway, PDN gateway equipment), an S-GW (Serving Gateway, serving gateway equipment), or the MME. Thereafter, calls are originated from a large number of UEs simultaneously before the procedure shown in FIG. 11 is started. This results in a problem of congestion in the network.

Therefore, the present invention has been achieved in order to solve the problem. It is an object of the present invention to provide a mobile communication method, a mobility management node, a packet switch, and a mobile station capable of avoiding congestion in a network even in a case where a failure has occurred in core network equipment in a state in which bearers are established between a large number of UEs and a packet data network.

A first feature of the present invention is, as the gist, a mobile communication method including steps of transmitting, by a mobility management node, a disconnection request signal including barring time to a mobile station when the mobility management node disconnects a bearer between the mobile station and a packet data network due to a predetermined reason in gateway equipment or the mobility management node in a state in which the bearer is established, and barring, by the mobile station, a mobile originating call directed to the packet data network for the barring time.

A second feature of the present invention is, as the gist, a mobile communication method including steps of transmitting, by a packet switch, a disconnection request signal including barring time to a mobile station when the packet switch disconnects a bearer between the mobile station and a packet data network due to a predetermined reason in an upper packet switch or the packet switch in a state in which the bearer is established, and barring, by the mobile station, a mobile originating call directed to the packet data network for the barring time.

A third feature of the present invention is, as the gist, a mobility management node including a transmission unit configured to transmit a disconnection request signal including barring time to a mobile station when disconnecting a bearer between the mobile station and a packet data network due to a predetermined reason in gateway equipment or the mobility management node in a state in which the bearer is established.

A fourth feature of the present invention is, as the gist, a packet switch including a transmission unit configured to transmit a disconnection request signal including barring time to a mobile station when disconnecting a bearer between the mobile station and a packet data network due to a predetermined reason in an upper packet switch or the packet switch in a state in which the bearer is established.

A fifth feature of the present invention is, as the gist, a mobile station including a mobile originating call barring unit configured to bar a mobile originating call directed to a packet data network for barring time in a case where a disconnection request signal including the barring time is received from a mobility management node or a packet switch in a state in which a bearer between the packet data network and the mobile station is established.

BRIEF DESCRIPTION OF DRAWINGS

FIG. 11 is a sequence diagram showing an operation of a conventional mobile communication system.

DESCRIPTION OF EMBODIMENTS (Mobile Communication System According to First Embodiment of Present Invention)

A mobile communication system according to a first embodiment of the present invention will now be described with reference to FIGS. 1 to 6. The present embodiment will be described by taking a mobile communication system of the LTE system as an example.

Figure 1:
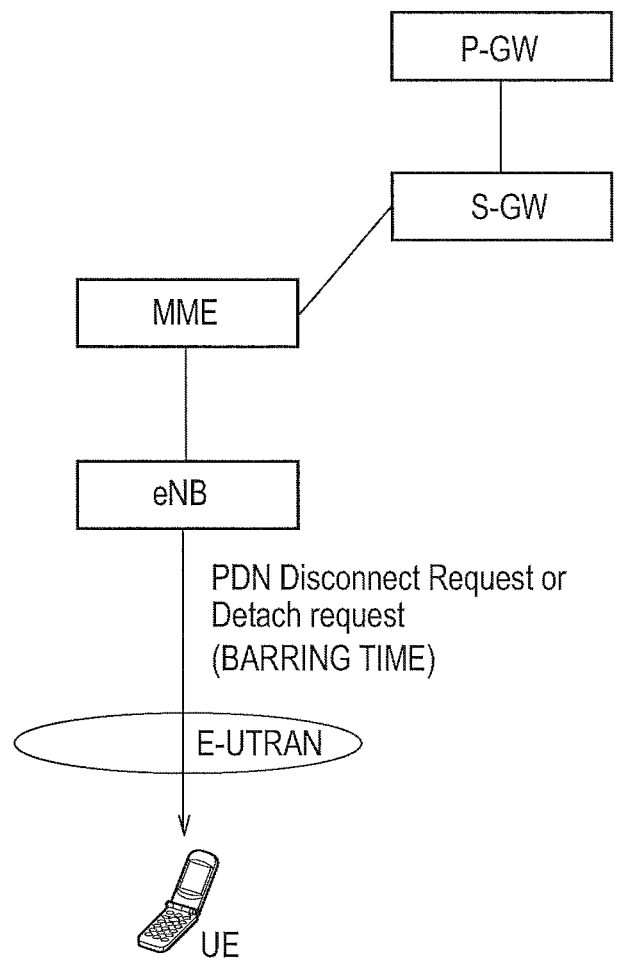
FIG. 1 is a general configuration diagram of a mobile communication system according to a first embodiment of the present invention.

As shown in FIG. 1, the mobile communication system according to the present embodiment includes a P-GW, an S-GW, an MME, and an eNB (radio base station) within an E-UTRAN (Evolved Universal Terrestrial Radio Access Network).

Figure 2:
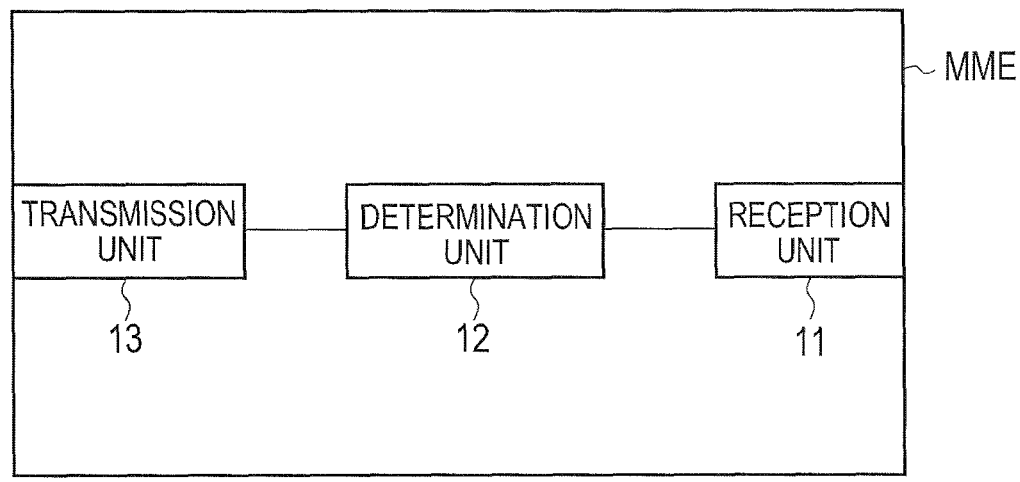
FIG. 2 is a functional block diagram of an MME according to the first embodiment of the present invention.

As shown in FIG. 2, the MME includes a reception unit 11, a determination unit 12, and a transmission unit 13.

The reception unit 11 is configured to receive various signals from the UE, the eNB, and the S-GW. For example, the reception unit 11 is configured to receive a bearer disconnection request signal from the S-GW.

The determination unit 12 is configured to be responsive to detection of a predetermined reason such as a failure in the S-GW or the P-GW or a predetermined reason such as a failure in the MME, to determine to invoke mobile originating call barring, notify the transmission unit 13 to that effect, and disconnect a bearer of a specific UE.

For example, the determination unit 12 may be configured to detect a predetermined reason such as a failure in the S-GW or the P-GW on the basis of a bearer disconnection request signal received by the reception unit 11.

Furthermore, the determination unit 12 may be configured to disconnect a bearer of a UE that is specified by a bearer disconnection request signal received by the reception unit 11. Or the determination unit 12 may be configured to disconnect a bearer of a specific UE on the basis of a predetermined rule.

The transmission unit 13 is configured to transmit various signals to a UE, the eNB and the S-GW.

For example, the transmission unit 13 is configured to transmit a "PDN Disconnection Request" or a "Detach Request" including barring time to a UE in response to a notice from the determination unit 12.

Here, the transmission unit 13 is configured to transmit a "PDN Disconnection Request" including barring time to a UE when disconnecting one bearer out of a plurality of bearers.

On the other hand, the transmission unit 13 is configured to transmit a "Detach Request" including barring time to a UE when disconnecting all remaining bearers.

Figure 3:
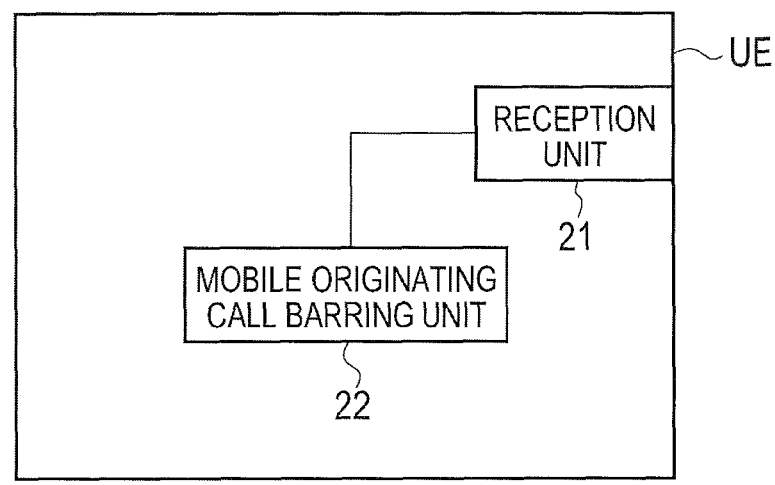
FIG. 3 is a functional block diagram of a UE according to the first embodiment of the present invention.

As shown in FIG. 3, a UE includes a reception unit 21 and a mobile originating call barring unit 22.

The reception unit 21 is configured to receive various signals from the eNB and the MME. For example, the reception unit 21 is configured to receive the "PDN Disconnection Request" and the "Detach Request" from the MME.

The mobile originating call barring unit 22 is configured to bar a mobile originating call directed to a specific APN in response to an order from the MME.

For example, it is now supposed that the reception unit 21 receives a "PDN Disconnection Request/Detach Request" or a "Deactivate PDP Context Request" in a state in which a bearer is established between a UE and the packet data network. The mobile originating call barring unit 22 is configured to bar a mobile originating call directed to the packet data network relating to the "PDN Disconnection Request/Detach Request" or the "Deactivate PDP Context Request" for barring time included in the "PDN Disconnection Request/Detach Request" or the "Deactivate PDP Context Request" in this case.

Hereafter, operation of the mobile communication system according to the present embodiment will be described with reference to FIGS. 4 to 6.

First, operation conducted in the mobile communication system according to the present embodiment in a case where a failure has occurred in the P-GW in a state in which a bearer is established between a UE and the packet data network will now be described with reference to FIG. 4.

Figure 4:
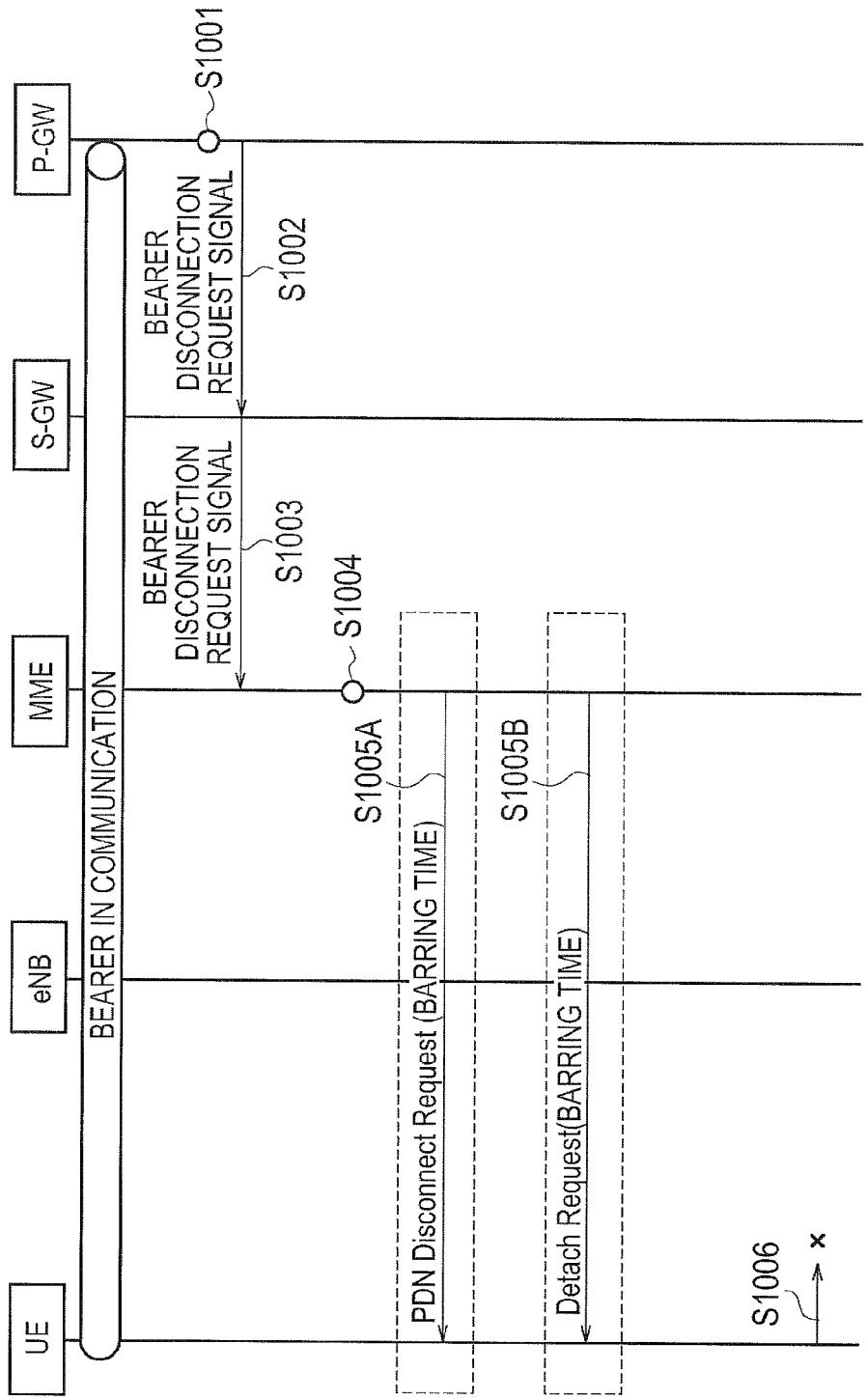
FIG. 4 is a sequence diagram showing an operation of the mobile communication system according to the first embodiment of the present invention.

If the P-GW detects a failure at step S1001 as shown in FIG. 4, the P-GW transmits a bearer disconnection request signal to the S-GW to request disconnection of a specific bearer at step S1002.

At step S1003, the S-GW disconnects the bearer and transmits a bearer disconnection request signal to the MME to request disconnection of the bearer.

At step S1004, in response to the bearer disconnection request signal, the MME detects that a failure has occurred in the P-GW and determines to bar a mobile originating call directed to a specific packet data network (APN) from a specific UE.

The MME disconnects the bearer and transmits the "PDN Disconnection Request" or the "Detach request" including barring time to the specific UE at step S1005A or S1005B.

At step S1006, the UE bars a mobile originating call directed to the packet data network (APN) for the barring time included in the received "PDN Disconnection Request" or Detach Request."

Secondly, operation conducted in the mobile communication system according to the present embodiment in a case where a failure has occurred in the S-GW in a state in which a bearer is established between a UE and the packet data network will now be described with reference to FIG. 5.

Figure 5:
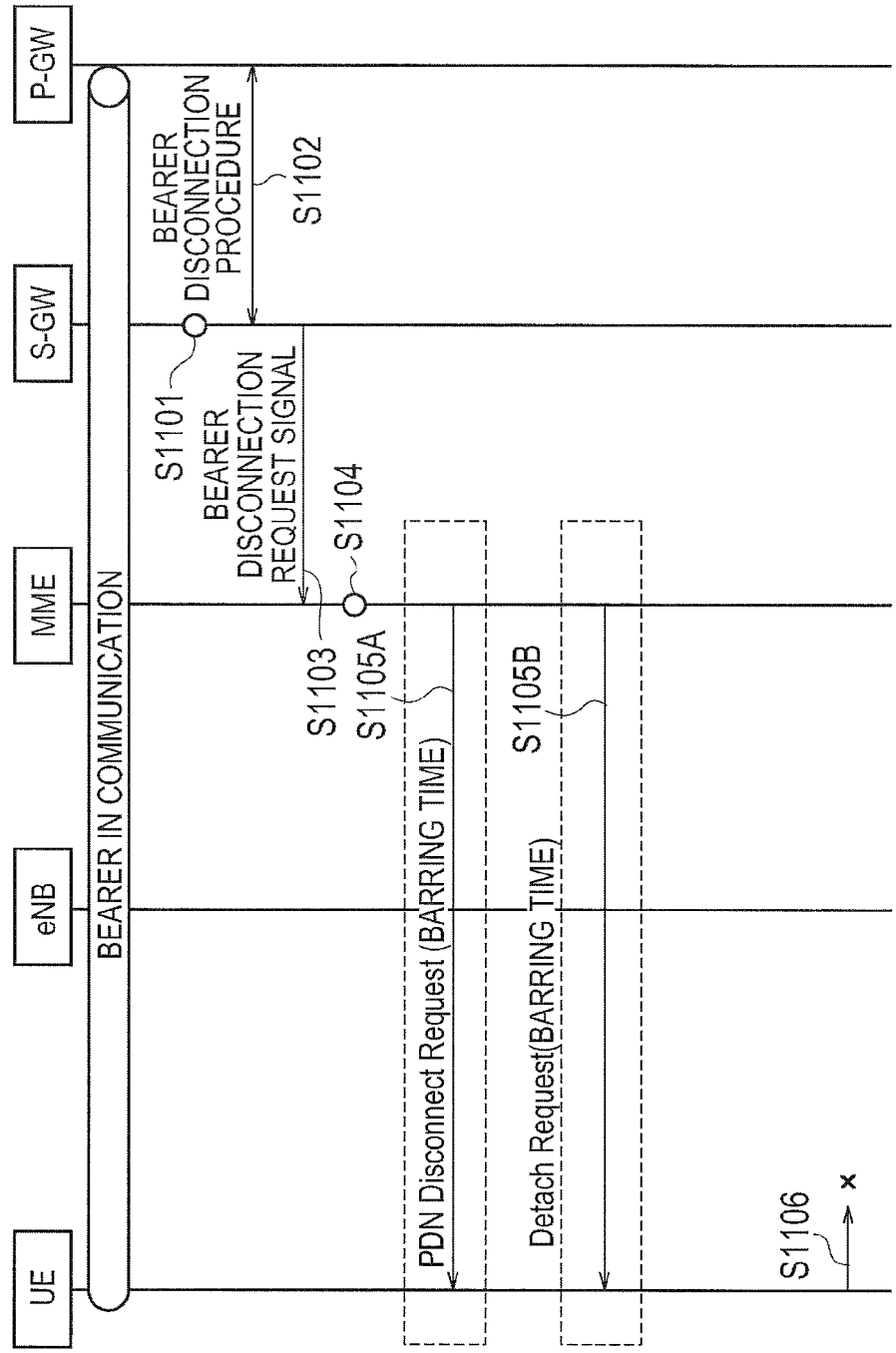
FIG. 5 is a sequence diagram showing an operation of the mobile communication system according to the first embodiment of the present invention.

If the S-GW detects a failure at step S1101 as shown in FIG. 5, the S-GW executes a disconnection procedure of a specific bearer between the S-GW and the P-GW at step S1102, and transmits a bearer disconnection request signal to the MME to request disconnection of the bearer at step S1103.

At step S1104, in response to the bearer disconnection request signal, the MME detects occurrence of a failure in the S-GW and determines to bar a mobile originating call directed to a specific packet data network (APN) from a specific UE.

The MME disconnects the bearer, and transmits a "PDN Disconnection Request" or a "Detach Request" including barring time to the specific UE at step S1105A or S1105B.

At step S1106, the UE bars a mobile originating call directed to the packet data network (APN) for the barring time included in the received "PDN Disconnection Request" or "Detach Request."

Thirdly, operation conducted in the mobile communication system according to the present embodiment in a case where a failure has occurred in the MME in a state in which a bearer is established between a UE and the packet data network will now be described with reference to FIG. 6.

Figure 6:
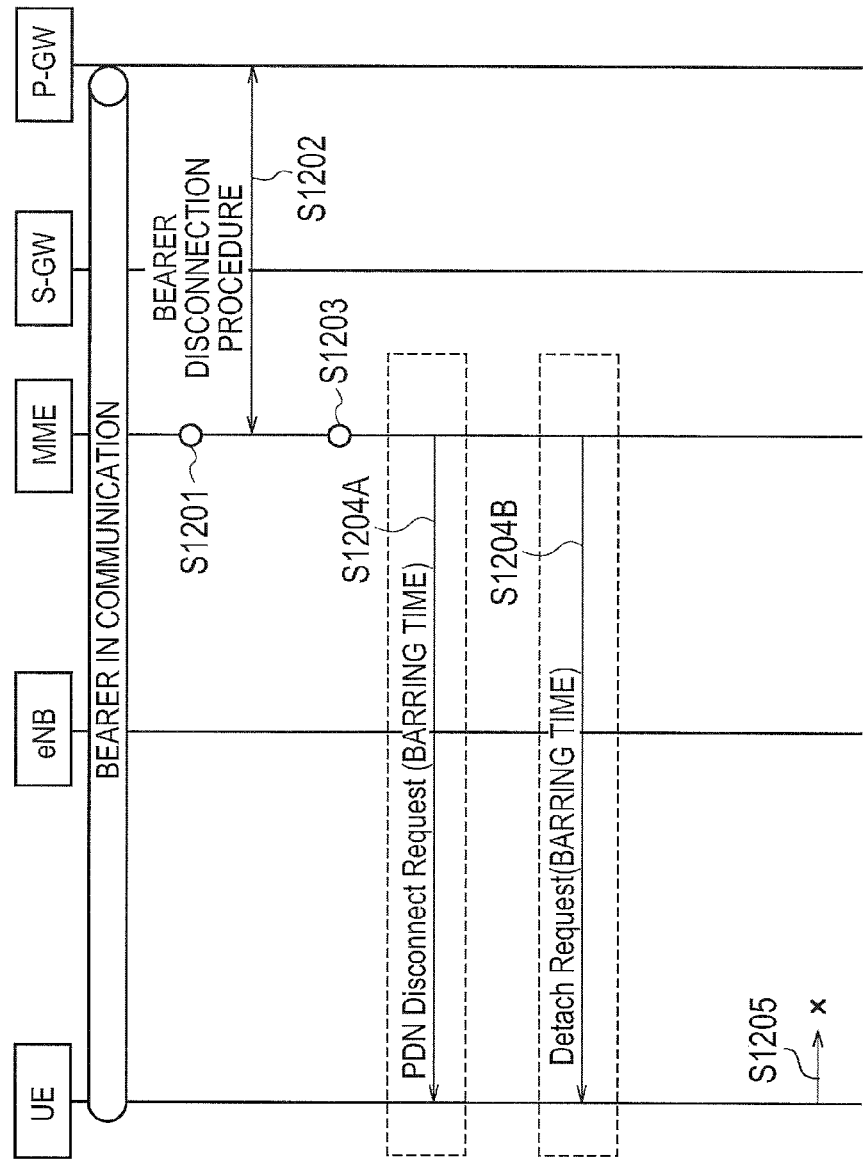
FIG. 6 is a sequence diagram showing an operation of the mobile communication system according to the first embodiment of the present invention.

If the MME detects a failure at step S1201 as shown in FIG. 6, the MME executes a disconnection procedure of a specific bearer between the MME and the P-GW at step S1202.

At step S1203, the MME determines to bar a mobile originating call directed to a specific packet data network (APN) from a specific UE.

At step S1204A or S1204B, the MME transmits a "PDN Disconnection Request" or a "Detach Request" including barring time to the specific UE.

At step S1205, the UE bars a mobile originating call directed to the packet data network (APN) for the barring time included in the received "PDN Disconnection Request" or "Detach Request."

In a case where a failure has occurred in the S-GW, P-GW or MME in a state in which bearers are established between a large number of UEs and a packet data network, it is possible, in the mobile communication system according to the present embodiment, to bar a mobile originating call directed to a specific packet data network (APN) from a specific UE by transmitting the "PDN Disconnection Request" or "Detach Request" including the barring time to the specific UE. As a result, it is possible to avoid congestion in the network.

(Mobile Communication System According to Second Embodiment of Present Invention)

Hereafter, a mobile communication system according to a second embodiment of the present invention will be described paying attention to differences from the mobile communication system according to the first embodiment, with reference to FIGS. 7 to 10. The present embodiment will be described by taking a mobile communication system of WCDMA system as an example.

Figure 7:
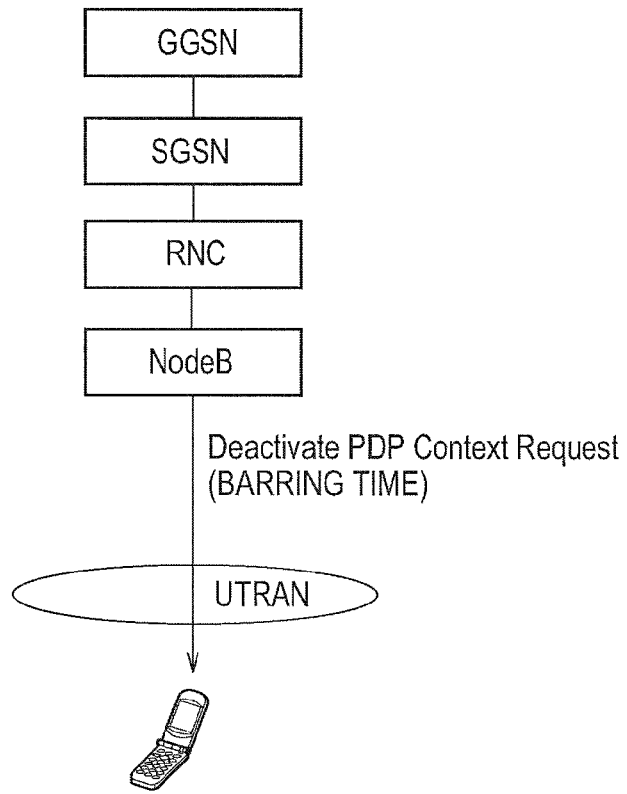
FIG. 7 is a general configuration diagram of a mobile communication system according to a second embodiment of the present invention.

As shown in FIG. 7, the mobile communication system according to the present embodiment includes a GGSN, an SGSN (Serving GPRS Support Node, packet switch), and an RNC (Radio Network Controller, radio line controller) and a Node B (radio base station) in a UTRAN (Evolved Universal Terrestrial Radio Access Network).

Figure 8:
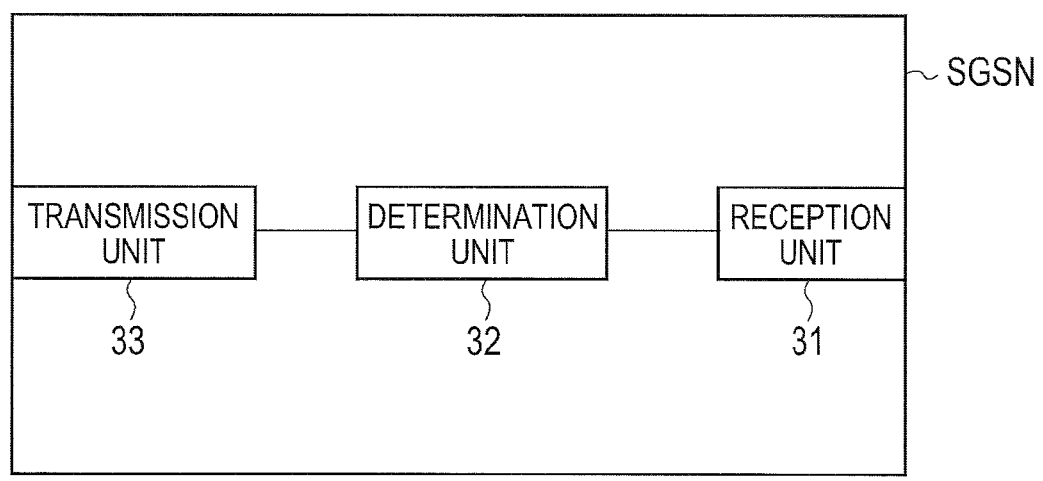
FIG. 8 is a functional block diagram of an SGSN according to the second embodiment of the present invention.

As shown in FIG. 8, the SGSN includes a reception unit 31, a determination unit 32, and a transmission unit 33.

The reception unit 31 is configured to receive various signals from a UE, the RNC or the GGSN. For example the reception unit 31 is configured to receive a bearer disconnection request signal from the GGSN.

The determination unit 32 is configured to be responsive to detection of a predetermined reason such as a failure in the GGSN or a predetermined reason such as a failure in the SGSN, to determine to invoke mobile originating call barring, notify the transmission unit 33 to that effect, and disconnect a bearer of a specific UE.

For example, the determination unit 32 may be configured to detect a predetermined reason such as a failure in the GGSN on the basis of a bearer disconnection request signal received by the reception unit 31.

Furthermore, the determination unit 32 may be configured to disconnect a bearer of a UE that is specified by a bearer disconnection request signal received by the reception unit 31. Or the determination unit 32 may be configured to disconnect a bearer of a specific UE on the basis of a predetermined rule.

The transmission unit 33 is configured to transmit various signals to a UE, the RNC and the GGSN.

For example, the transmission unit 33 is configured to transmit a "Deactivate PDP Context Request" including barring time to a UE in response to a notice from the determination unit 32.

Furthermore, the reception unit 21 in a UE is configured to receive various signals from the NodeB, RNC and SGSN. For example, the reception unit 21 is configured to receive the "Deactivate PDP Context Request" from the SGSN.

The mobile originating call barring unit 22 is configured to bar a mobile originating call directed to a specific APN in response to an order from the SGSN.

For example, it is now supposed that the reception unit 21 receives a "Deactivate PDP Context Request" in a state in which a bearer is established between a UE and the packet data network. The mobile originating call barring unit 22 is configured to bar a mobile originating call directed to the packet data network according to the "Deactivate PDP Context Request" for barring time included in the "Deactivate PDP Context Request" in this case.

Hereafter, operation of the mobile communication system according to the present embodiment will be described with reference to FIG. 9 and FIG. 10.

First, operation conducted in the mobile communication system according to the present embodiment in a case where a failure has occurred in the GGSN in a state in which a bearer is established between a UE and the packet data network will now be described with reference to FIG. 9.

Figure 9:
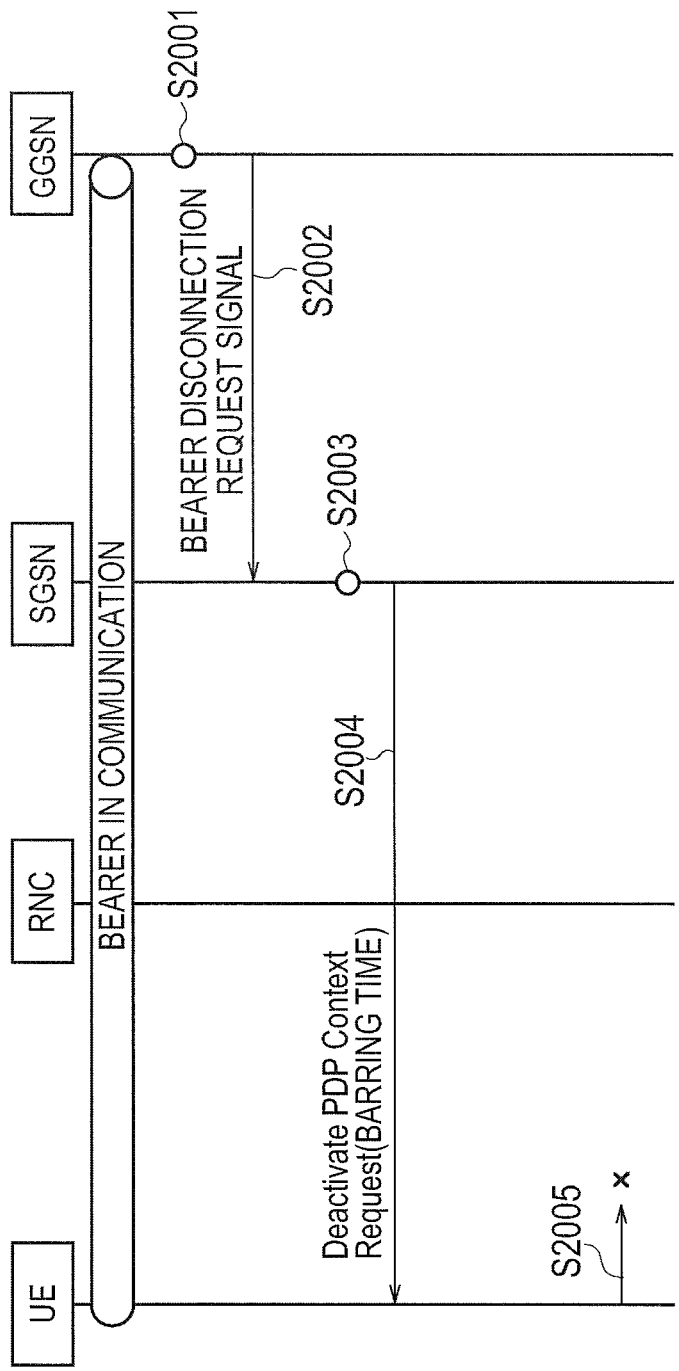
FIG. 9 is a sequence diagram showing an operation of the mobile communication system according to the second embodiment of the present invention.

If the GGSN detects a failure at step S2001 as shown in FIG. 9, the GGSN transmits a bearer disconnection request signal to the SGSN to request disconnection of a specific bearer at step S2002.

At step S2003, in response to the bearer disconnection request signal, the SGSN detects that a failure has occurred in the GGSN and determines to bar a mobile originating call directed to a specific packet data network (APN) from a specific UE.

The SGSN disconnects the bearer and transmits the "Deactivate PDP Context Request" including barring time to the specific UE at step S2004.

At step S2005, the UE bars a mobile originating call directed to the packet data network (APN) for the barring time included in the received "Deactivate PDP Context Request."

Secondly, operation conducted in the mobile communication system according to the present embodiment in a case where a failure has occurred in the SGSN in a state in which a bearer is established between a UE and the packet data network will now be described with reference to FIG. 10.

Figure 10:
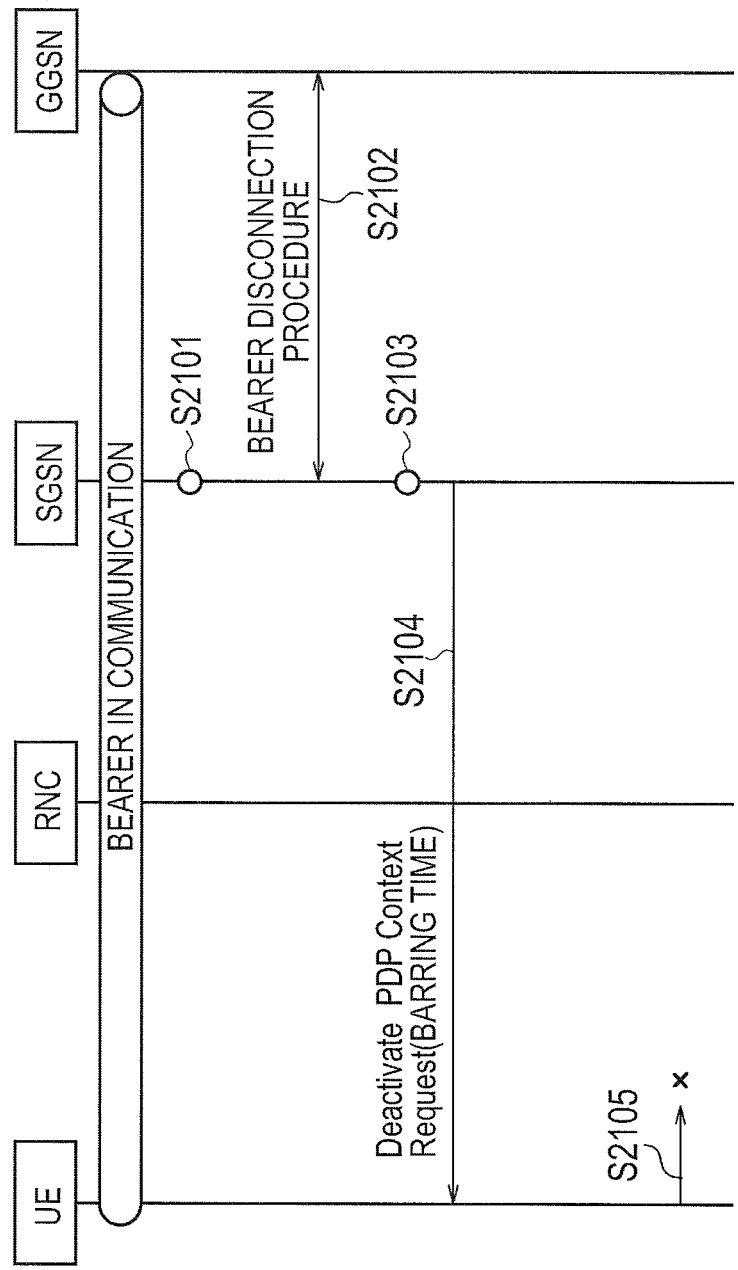
FIG. 10 is a sequence diagram showing an operation of the mobile communication system according to the second embodiment of the present invention.

If the SGSN detects a failure at step S2101 as shown in FIG. 10, the SGSN executes a disconnection procedure of a specific bearer between the SGSN and the GGSN at step S2102.

At step S2103, the SGSN determines to bar a mobile originating call directed to a specific packet data network (APN) from a specific UE.

The SGSN disconnects the bearer, and transmits a "Deactivate PDP Context Request" including barring time to the specific UE at step S2104.

At step S2105, the UE bars a mobile originating call directed to the packet data network (APN) for the barring time included in the received "Deactivate PDP Context Request."

In a case where a predetermined reason such as a failure has occurred in the GGSN or SGSN in a state in which bearers are established between a large number of UEs and a packet data network, it is possible, in the mobile communication system according to the present embodiment, to bar a mobile originating call directed to a specific packet data network (APN) from a specific UE by transmitting the "Deactivate PDP Context Request" including the barring time to the specific UE. As a result, it is possible to avoid congestion in the network.

Features of the embodiments described heretofore may be represented as follows.

A first feature of the embodiments is, as the gist, a mobile communication method including steps of transmitting, by an MME (mobility management node), a "PDN Disconnection Request/Detach request (disconnection request signal)" including barring time to a UE (mobile station) when the MME disconnects a bearer between the UE and a packet data network due to a predetermined reason such as a failure in S-GW/P-GW (gateway equipment) or the MME in a state in which the bearer is established, and barring, by the UE, a mobile originating call directed to the packet data network for the barring time.

A second feature of the embodiments is, as the gist, a mobile communication method including steps of transmitting, by an SGSN (packet switch), a "Deactivate PDP Context Request (disconnection request signal)" including barring time to a UE when the SGSN disconnects a bearer between the UE and a packet data network due to a predetermined reason such as a failure in a GGSN (upper packet switch) or the SGSN in a state in which the bearer is established, and barring, by the UE, a mobile originating call directed to the packet data network for the barring time.

A third feature of the embodiments is, as the gist, an MME including a transmission unit 13 configured to transmit a "PDN Disconnection Request/Detach Request" including barring time to a UE when disconnecting a bearer between the UE and a packet data network due to a predetermined reason such as a failure in S-GW/P-GW or MME in a state in which the bearer is established.

A fourth feature of the embodiments is, as the gist, an SGSN including a transmission unit 33 configured to transmit a "Deactivate PDP Context Request" including barring time to a UE when disconnecting a bearer between the UE and a packet data network due to a predetermined reason such as a failure in an GGSN or the SGSN in a state in which the bearer is established.

A fifth feature of the embodiments is, as the gist, a UE including a mobile originating call barring unit 22 configured to bar a mobile originating call directed to a packet data network for barring time in a case where a "PDN Disconnection Request/Detach Request" or "Deactivate PDP Context Request" including the barring time is received from an MME or a SGSN in a state in which a bearer between the packet data network and the UE is established.

By the way, the above-described operation of the UE, eNB, NodeB, RNC, MME, S-GW, SGSN and GGSN may be executed by hardware, may be executed by a software module that is executed by a processor, or may be executed by a combination of them.

The software module may be provided in a storage medium of an arbitrary form such as a RAM (Random Access Memory), a flash memory, a ROM (Read Only Memory), an EPROM (Erasable Programmable ROM), an EEPROM (Electronically Erasable and Programmable ROM), a register, a hard disc, a removable disc, or a CD-ROM.

Such a storage medium is connected to a processor to make it possible for the processor to read/write information from/into the storage medium. Furthermore, such a storage medium may be integrated with the processor. Furthermore, the storage medium and the processor may be provided in an ASIC. Such an ASIC may be provided in the UE, eNB, NodeB, RNC, MME, S-GW, SGSN, or GGSN. Furthermore, the storage medium and the processor may be provided in the UE, eNB, NodeB, RNC, MME, S-GW, SGSN, or GGSN as discrete components.

Heretofore, the present invention has been described in detail by using the embodiments. However, it is apparent to those skilled in the art that the present invention is not restricted to the embodiments described in the present specification. The present invention can be executed as a modified and changed form without departing from the spirit and scope of the present invention defined by statements in claims. Therefore, statements in the present specification aim at illustrative description, and do not have restrictive meaning on the present invention at all.

By the way, all contents of Japanese Patent application No. 2011-219212 (filed on Oct. 3, 2011) are incorporated into the present application specification by reference.

Industrial Applicability

As described heretofore, it is possible according to the present invention to provide a mobile communication method, a mobility management node, a packet switch and a mobile station capable of avoiding congestion in a network even in a case where a failure has occurred in core network equipment in a state in which bearers are established between a large number of UEs and a packet data network.

Reference Signs List

P-GW: PDN gateway equipment
S-GW: Serving gateway equipment
MME: Mobility management node
eNB, NodeB: Radio base station
GGSN: Upper packet switch
SGSN: Packet switch
RNC: Radio line controller
UE: Mobile station
11, 21, 31: Reception unit
12, 32: Determination unit
13, 33: Transmission unit
23: Mobile originating call barring unit

The invention claimed is:

1. A mobile communication method comprising steps of:
transmitting, by a mobility management node, a bearer disconnection request signal including barring time to a mobile station when the mobility management node disconnects the bearer between the mobile station and a packet data network due to a failure in gateway equipment or the mobility management node in a state in which the bearer is established; and
barring, by the mobile station, a mobile originating call directed to the packet data network based on the barring time included in the bearer disconnection signal, wherein
at the step of transmitting the bearer disconnection request signal, the mobility management node decides to bar the call origination directed to the packet data network and transmits the bearer disconnection request signal, when the mobility management node detects the failure.

2. A mobile communication method comprising steps of:
transmitting, by a packet switch, a bearer disconnection request signal including barring time to a mobile station when the packet switch disconnects the bearer between the mobile station and a packet data network due to a failure in an upper packet switch or the packet switch in a state in which the bearer is established; and
barring, by the mobile station, a mobile originating call directed to the packet data network based on the barring time included in the bearer disconnection signal, wherein
at the step of transmitting the bearer disconnection request signal, the packet switch decides to bar the call origination directed to the packet data network and transmits the bearer disconnection request signal, when the packet switch detects the failure.

3. A mobility management node comprising:
a transmission unit configured to transmit a bearer disconnection request signal including barring time to a mobile station when disconnecting the bearer between the mobile station and a packet data network due to a failure in gateway equipment or the mobility management node in a state in which the bearer is established; and a decision unit configured to decide to bar a call origination directed to the packet data network, when the mobility management node detects the failure, wherein the transmission unit transmits the bearer disconnection request signal, when the decision unit decides to bar the call origination.

4. A packet switch comprising:

a transmission unit configured to transmit a bearer disconnection request signal including barring time to a mobile station when disconnecting the bearer between the mobile station and a packet data network due to a failure in an upper packet switch or the packet switch in a state in which the bearer is established; and a decision unit configured to decide to bar a call origination directed to the packet data network, when the packet switch detects the failure, wherein the transmission unit transmits the bearer disconnection request signal, when the decision unit decides to bar the call origination.

5. A mobile station comprising:

a mobile originating call barring unit configured to bar a mobile originating call directed to a packet data network, wherein the mobile originating call barring unit receives a bearer disconnection request signal including the barring time from a mobility management node or a packet switch in a state in which the bearer between the packet data network and the mobile station is established and the mobile originating call barring unit bars the mobile originating call based on the barring time included in the bearer disconnection request signal.

* * * * *